United States Patent

Kliman et al.

[11] Patent Number: 6,042,265
[45] Date of Patent: Mar. 28, 2000

[54] SENSORLESS ESTIMATION OF ROTOR TEMPERATURE IN INDUCTION MOTORS

[75] Inventors: Gerald Burt Kliman, Niskayuna, N.Y.; James Henry Dymond, Peterborough, Canada

[73] Assignee: General Electric Company, Schenectady, N.Y.

[21] Appl. No.: 09/001,233

[22] Filed: Dec. 30, 1997

[51] Int. Cl.[7] .................................................. G01K 1/12
[52] U.S. Cl. .................... 374/152; 374/153; 374/154; 374/166; 318/471; 318/473; 361/25
[58] Field of Search ................... 374/152, 153, 374/154, 166; 318/471, 473; 361/24, 25, 103

[56] References Cited

U.S. PATENT DOCUMENTS

| Re. 34,039 | 8/1992 | Kobayashi et al. | 73/862.336 |
|---|---|---|---|
| 3,753,064 | 8/1973 | Agarwal et al. | 318/803 |
| 4,041,361 | 8/1977 | Cornell | 318/802 |
| 4,672,288 | 6/1987 | Abbondanti | 318/806 |
| 4,761,703 | 8/1988 | Kliman et al. | 318/806 |
| 4,914,386 | 4/1990 | Zocholl | 318/490 |
| 4,926,105 | 5/1990 | Mischenko et al. | 318/805 |
| 5,345,158 | 9/1994 | Kliman et al. | |
| 5,480,220 | 1/1996 | Kumar | 318/803 |
| 5,677,606 | 10/1997 | Otake | 318/434 |

OTHER PUBLICATIONS

Pragasen Pillay, Ray Noland and Towhidul Haque, "Application of Genetic Algorithms To Motor Parameter Determination for Transient Torque Calculations", IEEE Transactions on Industry applications, vol. 33, No. 5, Sep./Oct. 1997, pp. 1273–1282.

Accumetrics Associates, Inc., Schenectady, New York, Advertising Brochure, 8 pages. Date: 1997.

Harold Penter, Ph.D, and William A. Del Mar, Editors, "Electrical Engineer's Handbook: Electric Power", John Wiley & Sons, Inc., 1949, pp. 9–62, 2–16–2–19, 2–26,2–27.

McGraw–Hill, Dictionary of Physics and Mathematics, pp. 570 and 991, 1978.

McGraw–Hill, Encyclopedia of Physics, p. 1185, 1983.

*Primary Examiner*—Adolf Deneke Berhane
*Assistant Examiner*—Pia Tibbits
*Attorney, Agent, or Firm*—Marvin Snyder; Douglas E. Stoner

[57] ABSTRACT

Rotor temperature in induction motors is estimated without the need for any direct temperature sensors, by using only computer calculations based on data readily available in the motor control center. Thus for any given motor, it is generally possible to predetermine a relationship between rotor temperature and rotor resistance, so that by determining rotor resistance, rotor temperature can be calculated. Rotor resistance, in turn, can be calculated from measured information relating motor slip and motor torque. Any of several methods can be employed for determining torque and slip. Temperature estimation can be obtained by use of equivalent circuit methods, and additional relationships can be obtained from a simplified equivalent circuit.

14 Claims, 4 Drawing Sheets

6,042,265

SENSORLESS ESTIMATION OF ROTOR TEMPERATURE IN INDUCTION MOTORS

FIELD OF THE INVENTION

This invention relates to estimation of rotor temperatures in induction motors, and more particularly, how to obtain such temperature estimates from various physical and electrical motor parameters without using temperature sensors.

BACKGROUND OF THE INVENTION

In the application of large, line start, induction motors it is necessary to know the rotor temperature at shutdown in order to determine the time at which the motor may be restarted.

Typically, to determine this temperature, thermocouples embedded in the rotor next to a rotor bar are coupled to a battery operated telemetry system on the motor shaft. If the motor interior is accessible, contact probes are sometimes inserted or an infra-red scanner (with great uncertainty) can be used. It is usually impractical or difficult to get at the motor interior to measure rotor temperature. When knowledge of rotor temperature is essential and the motor is large enough, embedded sensors and telemetry are often used. It would thus be desirable to provide a low-cost, non-invasive method of estimating rotor temperature sufficiently well to obviate need for thermocouple telemetry or other invasive probes. Such method would desirably be available through a means that is convenient and easily enough obtainable to warrant installation on a broad range of motors extended to smaller horsepower ratings.

SUMMARY OF THE INVENTION

In accordance with a preferred embodiment of the invention, a device and method for estimating rotor temperature in induction motors, without need for any direct temperature sensors, are provided. These use only computer calculations which are based on data readily available in the motor control center.

For any given motor, it is generally possible to predetermine a relationship between rotor temperature and rotor resistance so that, by determining rotor resistance, the temperature can also be calculated and determined. Rotor resistance can be calculated and determined by measured information relating motor slip and motor torque. The torque, in turn, can be calculated and determined directly, or through measurement of motor voltage and current, as disclosed, for example, in commonly-assigned, U.S. Pat. No. 5,345,158, issued Sep. 6, 1994. The motor slip can be determined through any of several approaches, including direct measurement, measurement of certain frequencies in the motor current, stray flux or vibration, and stroboscopic techniques.

Also disclosed are several direct relationships using equivalent circuit methods, which may be used for temperature estimation along the lines outlined above, and some relationships based on a further simplification of the equivalent circuit.

DETAILED DESCRIPTION OF THE INVENTION

Various non-invasive diagnostic techniques are under development for industrial electric motors. All that is required to enable the diagnostic is at least two of the three voltages and currents at the motor terminals. These signals are usually available from current and potential transformers already installed, for other purposes, in a motor control center. Rotor temperature estimation requires these same signals, so only software modifications need be made to existing monitoring, protection or diagnostic systems. No additional hardware, e.g., sensors, probes, scanner, is necessary.

Figure 1:
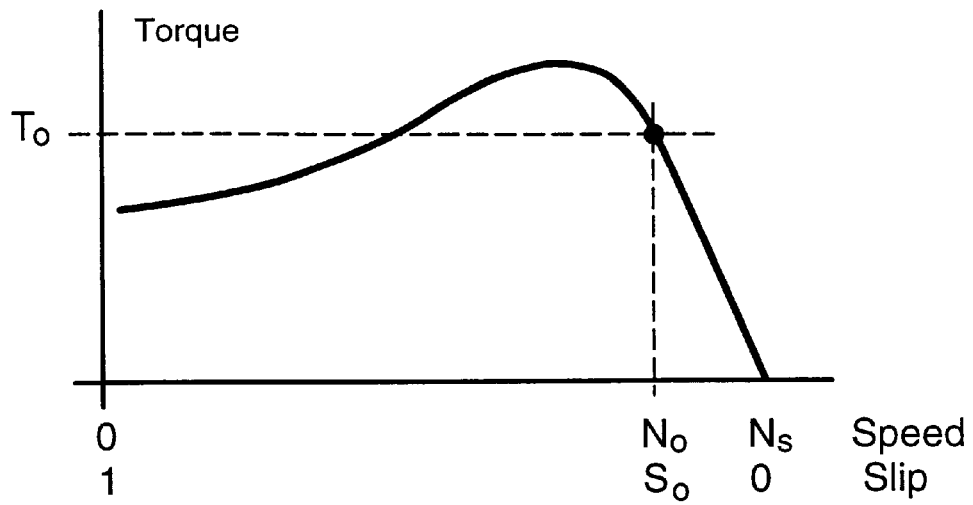
FIG. 1 is a typical torque-speed curve for an induction motor with a fixed magnitude of power frequency (usually 60 Hz) voltage applied.

FIG. 1 is a typical curve of torque versus speed for an induction motor with a fixed magnitude of power frequency (usually 60 Hz) voltage applied. The nominal or rated torque $T_0$ occurs on this characteristic at some speed $N_0$ less than the synchronous speed $N_S$. The measure of this speed defect is the "slip," $S_0$, measured along a slip axis, which may be in revolutions per minute (rpm) or in frequency (Hz), or which may be normalized (per unit).

Figure 2:
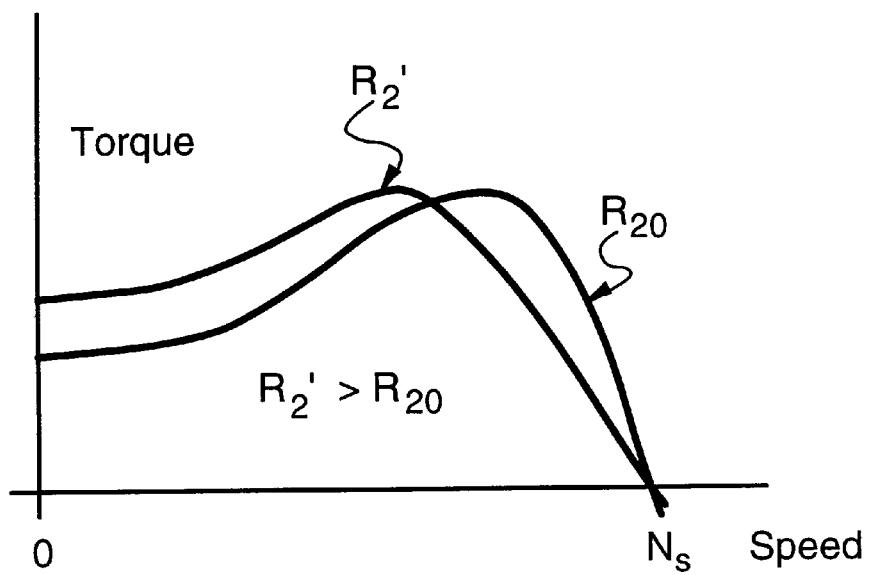
FIG. 2 illustrates variations in the torque-speed curve of FIG. 1 as related to rotor resistance.

The slope or shape of the torque versus speed curve depends on the rotor resistance as shown in FIG. 2. That is, the slope of the normal operating characteristic will become shallower with decreasing speed or increasing slip working back from $N_S$, and as the rotor resistance increases, result in a higher value of slip for the same torque delivered to the load. FIG. 2 illustrates this for two resistances, $R_2'$ and $R_{20}$, with $R_2'$ greater than $R_{20}$. Further, the rotor resistance will vary with rotor temperature in a known manner for each motor if the design information is known. If this information is not available, general knowledge of large motor parameters will suffice to yield a reasonable estimate. By comparing the actual slip with the predicted or estimated value for the particular torque, the rotor resistance, and hence rotor temperature, may be estimated.

Most motor installations are not equipped with torque sensors. However a method disclosed in commonly-assigned, U.S. Pat. No. 5,345,158, issued Sep. 6, 1994, is available for estimating induction motor electromagnetic (or airgap) torque with good precision using only the voltages and currents at the motor terminals. This torque value may then be employed in the rotor temperature estimation process.

Most motor installations are not equipped with speed sensors so a direct measurement of the speed/slip is not possible. However signals appear in the current that may be used to estimate speed quite precisely. Virtually all motors have some degree of rotor asymmetry, which results in the appearance of frequencies in the motor current related to the slip. The most prominent of these is found at two slip frequencies below the line frequency and its magnitude is often used as a measure of the severity and number of broken rotor bars. Examination of this spectrum, which may be automated, therefore yields the required slip frequency.

Several methods of detecting speed through examination of rotor slot passing frequency have also been reported. In cases where the signal-to-noise ratio is too low (because of no asymmetry, closed slots, or excessive complexity in the spectrum), a measurement of speed by strobe light at the time the currents and voltages are acquired will suffice, but with reduced accuracy. In some instances a measurement of stray flux in the vicinity of the motor may be used to estimate speed if a coil or other flux sensor is installed.

Figure 3:
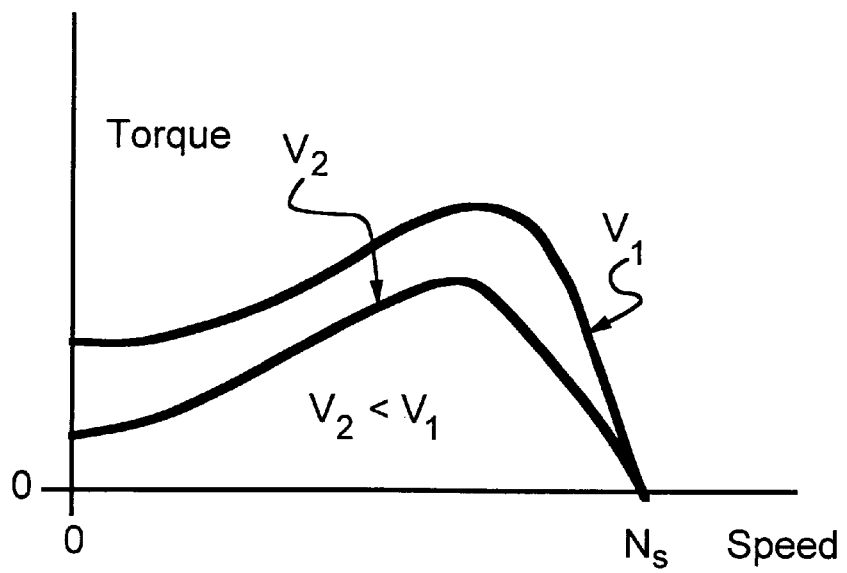
FIG. 3 illustrates variations in the torque-speed curve of FIG. 1 as related to applied voltage.

A complication is that the torque versus speed curve of FIG. 1 also depends on voltage, as shown in FIG. 3. That is, the slip at a particular torque will increase as the voltage decreases. However since it is known that the torque varies as the square of the voltage, and both the nominal and actual voltages are known, a simple compensation may be applied; i.e., the curves of FIG. 1 or FIG. 2 may be scaled vs. torque by the square of the actual-to-nominal voltage ratio.

Figure 4:
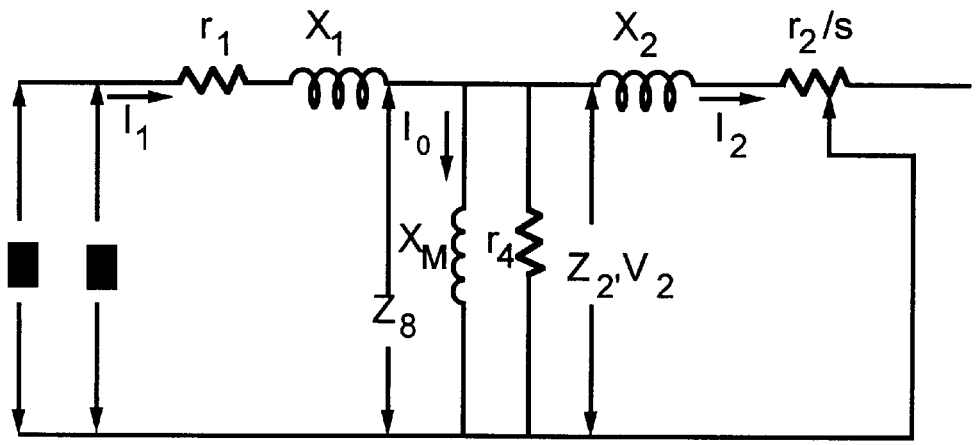
FIG. 4 illustrates the induction motor equivalent circuit used to determine the rotor resistance.

There are several ways to approach the actual computation of rotor resistance from which the rotor temperature is derived. The most direct is applicable if the motor parameters are known, which is often the case for large motors. The equivalent circuit of FIG. 4 may be analyzed to determine the rotor resistance by using, for example, "Method F" of IEEE standard 112–1991. In FIG. 4, the illustrated circuit is the "per phase equivalent circuit" and it is assumed that the motor is balanced, i.e., each phase is identical. The following parameters are designated on FIG. 4: $r_1$=stator resistance; $r_2$=rotor resistance (referenced to the stator); $X_1$=stator leakage reactance; $X_2$=rotor leakage reactance; $X_M$=magnetizing reactance; $r_4$=core loss equivalent resistance; s=per unit slip; V=line-neutral voltage; $I_1$=line current; Z=apparent input impedance; $V_2$=airgap voltage; $I_0$=magnetizing current; $I_2$=rotor current (referenced to the stator); $Z_g$=apparent airgap impedance; and $Z_2$=apparent rotor impedance (referenced to the stator).

Figure 5:
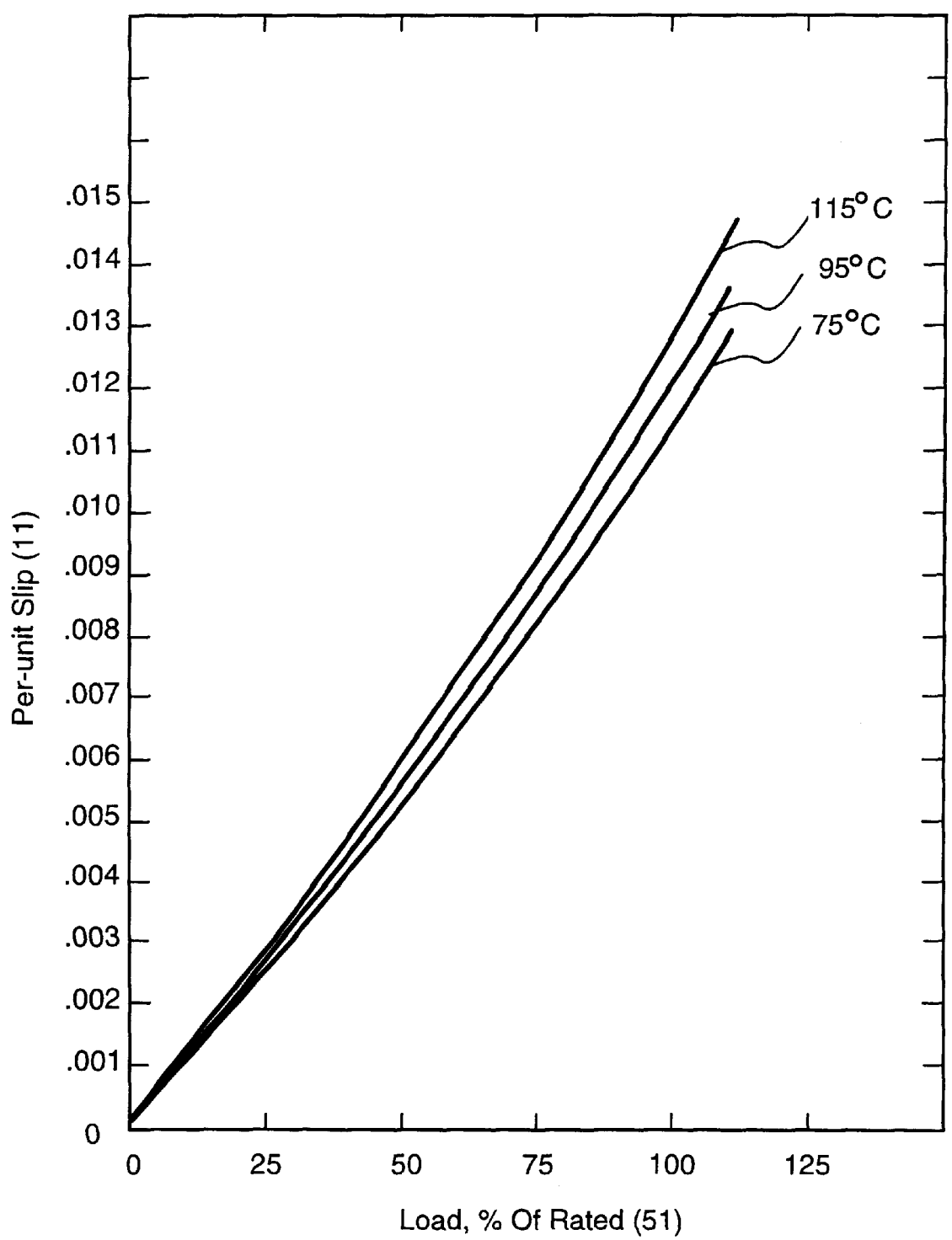
FIG. 5 illustrates dependency curves relating induction motor slip to load at various rotor temperatures, as used to compute rotor temperature.
Figure 6:
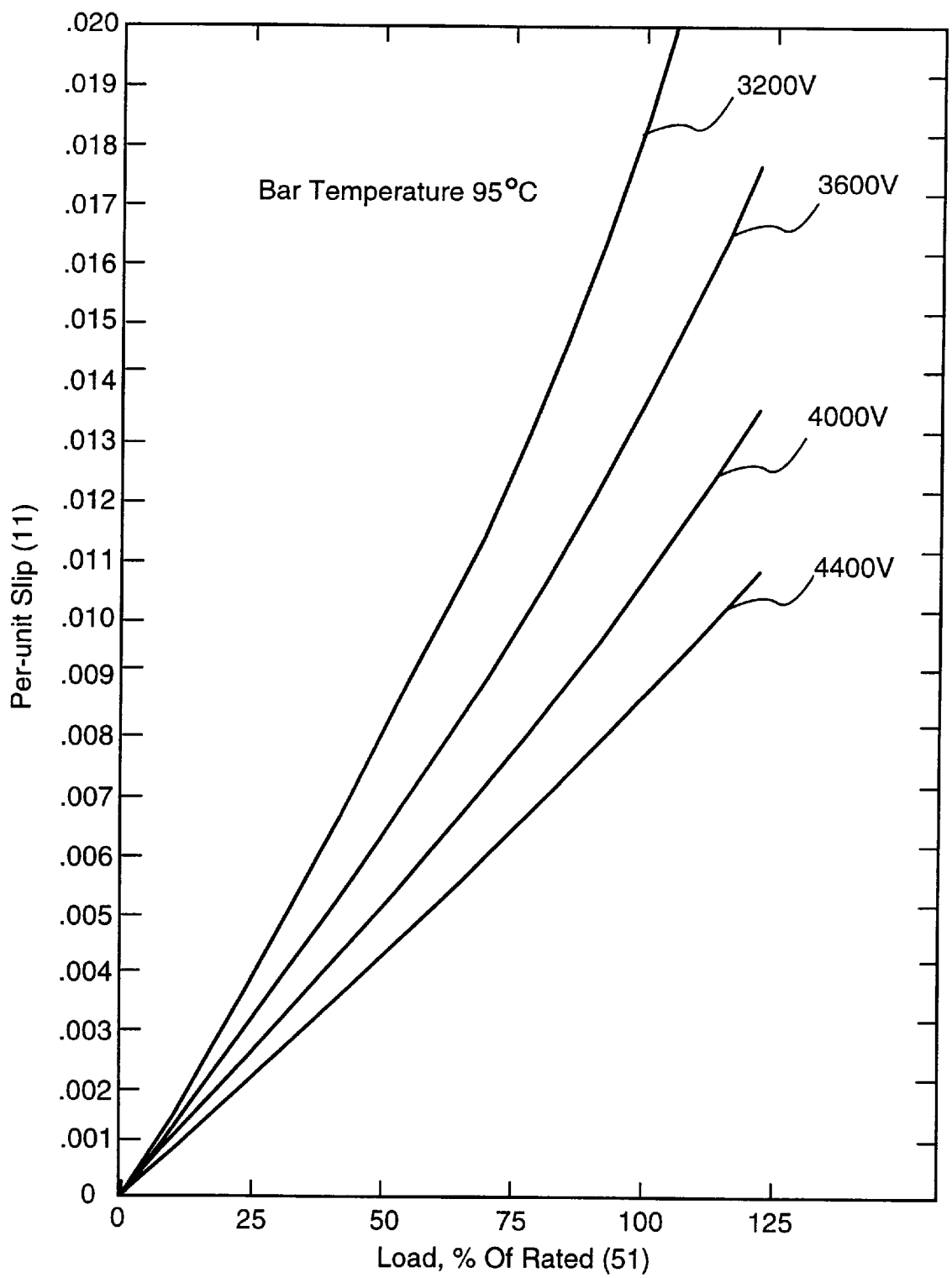
FIG. 6 graphically illustrates the effect of voltage on induction motor slip as a function of load, as used to compute rotor temperature.

If the details of the motor are known, temperature dependency curves relating slip to load at various rotor temperatures, such as, for example, 75° C., 95° C. and 115° C., may be generated and used for this purpose as shown in FIG. 5. In similar fashion, voltage dependency curves for the effect of line-neutral voltage, such as, for example 3200 volts, 3600 volts, 4000 volts and 4400 volts, on slip as a function of load at a given temperature (25° C. in this illustration) may be plotted and used as shown in FIG. 6. The curves of FIGS. 5 and 6 are representative of characteristics of a typical 8-pole motor.

Figure 7:
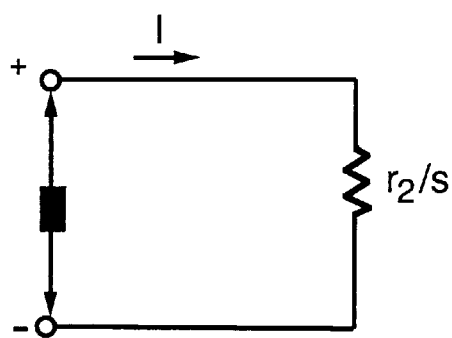
FIG. 7 illustrates a much simplified equivalent circuit for an induction motor, derived from the circuit of FIG. 4, which focuses only on energy conversion, and wherein only the rotor resistance is retained.

If nothing is known about the motor except for the nameplate data (including locked rotor conditions) an approximation to the equivalent circuit parameters may be derived using published methods and/or available software. Alternatively, a much simplified relationship may be derived by simplifying the equivalent circuit of FIG. 4 to focus on the energy conversion aspect. The result is the simple circuit of FIG. 7 where only the rotor resistance $r_2$ is retained. In that instance, if the nominal torque ($T_0$), slip ($S_0$) and voltage ($V_0$) are known from the nameplate and the torque (T'), slip (S') and voltage (V') are measured, the ratio of unknown rotor resistance ($R_2'$) to the nominal rotor resistance ($R_{20}$) may be simply calculated as:

$$R_2'/R_{20}=(V'/V_0)^2 \times (S'/S_0) \times (T_0/T')$$

If the applied voltage is fixed, then this expression may be refined to reflect realistic motors more closely (here set out directly in terms of unknown temperature (Te') and nominal temperature ($Te_0$) rather than rotor resistance):

$$Te'=(S'/S_0) \times (Te_0+k)-k$$

where k=234.5 for 100% conductivity copper and k=225.0 for aluminum with 62% conductivity, k being a constant determined by the conductivity of the metal used for the rotor cage.

In the preferred embodiment, temperature readings are deduced, using any of the above-disclosed approaches, on a regular, periodic basis while the motor is in operation, and these readings are stored in a temperature reading memory. Then, when the motor is shut down, these readings may be referred to and used to determine what the temperature of the motor was just before shutdown, which in turn is used to determine when the motor may be safely restarted.

While only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

What is claimed is:

1. A method for sensorless estimation of rotor temperature in an induction motor, comprising the steps of:

determining resistance of the rotor by determining both a motor slip and a motor torque;

utilizing torque-speed curves for the motor at different rotor resistances to determine the rotor resistance from the determined motor slip and torque; and estimating said rotor temperature from said rotor resistance using a known relationship between said resistance and said temperature.

2. The method of claim 1, wherein the step of determining motor torque is performed by a torque sensor.

3. The method of claim 1, wherein the step of determining motor torque includes the steps of measuring voltages and currents at terminals of said motor.

4. The method of claim 1, wherein the step of determining motor slip is performed by a speed sensor.

5. The method of claim 1, wherein the step of determining motor slip comprises measuring a spectrum of slip frequencies in currents at terminals of said motor.

6. The method of claim 1, wherein the step of determining motor slip comprises a measuring motor speed from rotor bar passing frequency.

7. The method of claim 1, wherein the step of determining motor torque comprises measuring voltages and currents at terminals of said motor, and wherein the step of determining motor slip is performed by measuring motor speed with a strobe light substantially simultaneously with the measurement of said voltages and currents.

8. The method of claim 1, wherein the step of determining the rotor resistance is compensated for dependence of the relationship between said determined torque and said determined slip upon voltage by measuring voltages at terminals of said motor and by using known relationships between voltage and torque for said motor.

9. The method of claim 1, wherein the step of estimating said rotor temperature is performed on a periodic basis, and further including the step of storing the estimates of rotor temperature in a temperature reading memory which retains said estimates for retrieval subsequent to motor shutdown.

10. A method for sensorless estimation of rotor temperature in an induction motor, comprising the steps of:

determining a motor slip and a motor load;

determining said rotor resistance from said motor slip and said motor load; and determining said rotor temperature using known temperature dependency relationships between slip and load at various rotor resistances and temperatures.

11. A method for sensorless estimation of rotor temperature in an induction motor, comprising the steps of:

determining a motor slip and a motor load;

measuring voltages at terminals of said motor;

determining resistance of the rotor from said motor slip and said motor load; and determining said rotor temperature using known voltage dependency relationships for the effect of voltage upon slip as a function of load at given resistances and temperatures.

12. A method for sensorless estimation of rotor temperature in an induction motor having a rotor, wherein said rotor resistance is designated $R_2'$, comprising:

measuring a motor torque $T'$, a motor slip $S'$, and a terminal voltage $V'$;

calculating said rotor resistance $R_2'$ from the measurements and from a known nominal torque $T_0$, nominal slip $S_0$, nominal voltage $V_0$, and nominal resistance $R_{20}$ for said rotor, using the relationship:

$$R_2'/R_{20} = (V'/V_0)^2 \times (S'/S_0) \times (T_0/T');$$

and estimating said rotor temperature from said rotor resistance $R_2'$ using a known relationship between said rotor resistance $R_2$ and said temperature.

13. The method of claim 12 wherein the nominal values for torque, slip, voltage and resistance for said rotor are obtained from nameplate data of said motor.

14. A method for sensorless estimation of rotor temperature in an induction motor having a rotor, wherein said rotor temperature is designated Te', comprising, for a fixed terminal voltage:

measuring a motor slip $S'$; and calculating said rotor temperature Te' from the measured slip $S'$ and from a known nominal slip $S_0$ and nominal temperature $Te_0$ for said motor, using the relationship:

$$Te' = (S'/S_0) \times (Te_0 + k) - k;$$

wherein k is a constant determined by the conductivity of bars used for said rotor.

* * * * *